Sept. 23, 1941.  W. C. GROENIGER  2,256,758
DEVICE FOR TRAPPING WASTE OUTLETS
Filed Sept. 27, 1939
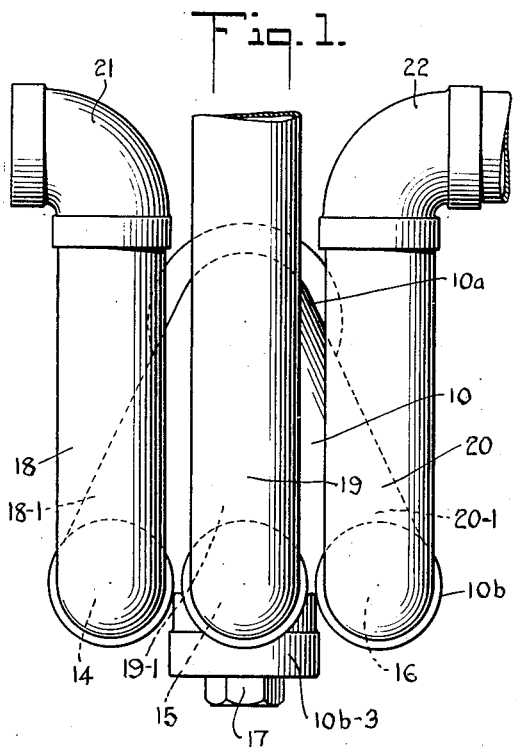
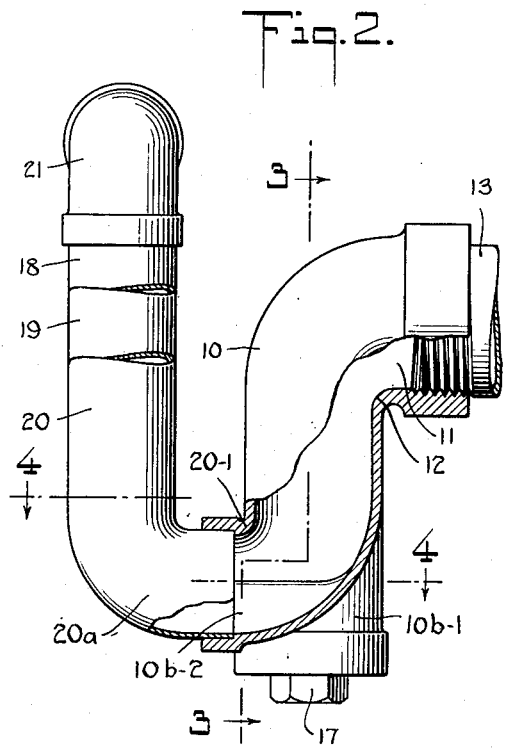
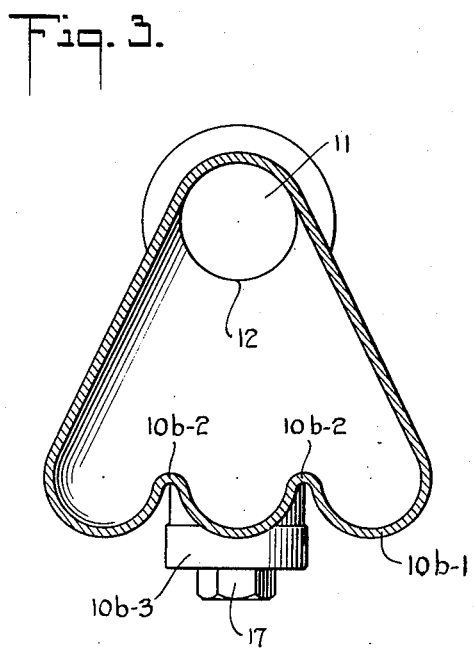
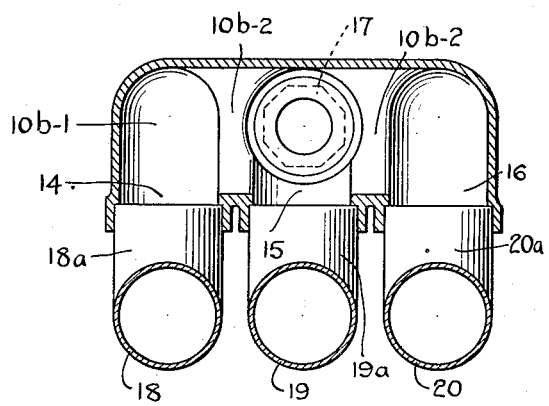
INVENTOR
William C. Groeniger
BY
Henry J. Lycke
HIS ATTORNEY Patented Sept. 23, 1941

2,256,758

UNITED STATES PATENT OFFICE 2,256,758

DEVICE FOR TRAPPING WASTE OUTLETS

William C. Groeniger, Columbus, Ohio, assignor to John B. Pierce Foundation, New York, N. Y., a corporation of New York Application September 27, 1939, Serial No. 296,773

4 Claims. (Cl. 182—18)

This invention relates to fixture trap devices useful in the plumbing art for stopping return flow of noxious gases from waste outlets, and in particular to fixture trap devices for trapping a plurality of waste outlets, in common, with respect to a single soil or other waste discharge pipe.

When several waste outlets are trapped in common with respect to soil, or other waste piping, it is customary practice to run the waste outlet piping into the trap device above the trap seal whereby free passage is afforded between the several waste outlets, one with the other or others, even though each is trapped relative to the soil or other waste piping. Such practice leads to air circulation through the freely interconnected waste outlets when the piping is heated, and to a consequent malodorous discharge of air from the waste drains of the plumbing fixtures when the piping has accumulated an internal coating of waste matter.

Further it is customary practice to so connect the waste outlet piping with the trap device as to direct flow therefrom at a relatively great angle to the general flow through the trap device, thus impeding, to a considerable extent, flow into and out of the trap device.

An object of the present invention, therefore, is to provide a trap device capable of trapping, in common, with respect to waste or soil piping, a plurality of waste outlets, and to, at the same time, trap the individual waste outlets, one with respect to the other or others.

An object is to provide a trap device which will unite the fluid streams flowing from the plurality of waste outlets while such streams are flowing in substantially the same direction substantially without flow restriction.

An object is to provide a novel type of pipe fitting for association with piping or with other pipe fittings in the formation of a trap device in accordance with the invention.

A feature of the invention resides in the provision for uniting, below the dip of the trap device, the streams from the individual down legs, so that they flow in merged relationship through the up leg.

Further features and objects of the invention will be apparent from the following detailed description.

In the drawing:

Fig. 1 represents a front elevation of one embodiment of fixture trap device pursuant to the invention.

Fig. 2 represents a side elevation, partly in vertical section of the fixture trap device of Fig. 1.

Fig. 3 represents a vertical section taken on the line 3—3, Fig. 2.

Fig. 4 represents a horizontal section taken on the line 4—4, Fig. 2.

Fixture trap devices embodying the principle of and accomplishing the objects of the invention may assume various structural forms according to various general designs common in the art. For instance, the component parts, namely, the down leg means, the up leg means, and the U-bend means, may be formed integral, with appropriate provision for satisfactory installation and cleaning, according to construction practices common in the art. Or, the component parts may be structurally separated in various arrangements and joined to form the complete fixture trap device.

In the illustrated instance, the plurality of down legs are formed as individual pipe fittings, and are joined with a single up leg, formed as an individual pipe fitting, portions of each combining to provide the return bend or U-bend of the trap.

The up leg fitting 10 is formed as a hollow body which diverges downwardly from the elbowed upper end 10a, to the oppositely directed elbowed lower end 10b. The elbowed upper end 10a is arranged to provide an out flow opening 11 and the crown weir 12 of the fixture trap device. The walls defining the opening 11 may be internally threaded, or otherwise adapted to connect with outflow piping 13.

The oppositely directed elbowed lower end 10b is arranged to form a plurality of inflow openings, here illustrated as three, namely, 14, 15 and 16, disposed side by side in a rectilinear alignment which is perpendicular to the length of the body portion. Dips of the trap, see 18—1, 19—1, and 20—1, are provided by those wall portions which define the upper parts of the inflow openings 14, 15 and 16, respectively.

Preferably integrally from the bottom wall 10b—1 of the up leg fitting 10, and between those of the inflow openings 14, 15, and 16 which are mutually adjacent, separator walls 10b—2, 10b—2 rise upwardly. And preferably integrally from bottom wall 10b—1, advantageously centrally thereof, depends wall 10b—3 forming a clean out opening threaded or otherwise adapted to receive the clean out plug 17.

The down leg fittings correspond in number to the number of inflow openings in the up leg. In the illustrated instance there are three down leg fittings 18, 19, and 20 corresponding, respectively, to the inflow openings 14, 15, and 16. Each of the down leg fittings 18, 19, and 20 has its lower end curved to form an elbow, as at 18a, 19a, and 20a, respectively. The elbowed lower ends of the down leg fittings connect with the inflow openings of the up leg as clearly shown in Figs. 2 and 4, thus, in combination with the elbowed lower end of the up leg, providing return bend or U-bend portions of the trap device.

The down leg fittings may be formed at their upper ends as found advantageous in the particular instance. As shown in Fig. 1, the two down leg fittings 18 and 20 are of shorter length than the intermediate down leg 19 and connect with inflow piping by means of elbow fittings 21 and 22.

As will be noted from the drawing, the elbows 18a, 19a, and 20a of the lower end portions of down leg fittings 18, 19 and 20, respectively, are preferably mutually parallel in their joinder with the up leg fitting, and the outflow openings thereof are consequently directed in the same direction.

The crown weir 12 controls the level of the liquid maintained as the trap seal, and, accordingly, each of the down legs are individually trapped as respects one another and are trapped in common as respects the outflow piping 13. Also, due to the peculiar structural characteristics of the device, the waste liquid flows without restriction through the down legs and unites below and adjacent the dips of the trap while flowing along substantially straight angles and in the same direction.

The upper portion of the up leg fitting 10, see Fig. 2, is advantageously of greater flow capacity than is the lower portion for accommodating simultaneous flow from the plurality of down legs.

While only one preferred embodiment of the invention is illustrated and described, it is to be distinctly understood that a great many structural changes may be made without departing from the generic spirit and scope of the invention as set forth herein and in the following claims.

I claim:

1. In a fixture trap device for trapping a plurality of waste outlets, a plurality of individual down legs, and a single up leg serving the said plurality of down legs in common, said plurality of down legs connecting with the said single up leg below the dip of the trap device.

2. In a fixture trap device for trapping a plurality of waste outlets, a plurality of individual down legs, and a single up leg serving the said plurality of down legs in common, said single up leg diverging downwardly from the crown weir thereof, and said plurality of down legs connecting with the said up leg below the dip of the trap device and side-by-side in substantially mutually parallel relationship.

3. A fixture trap device for trapping a plurality of waste outlets comprising a single up leg fitting having an outflow opening and crown weir formed at its upper end, and having an elbowed lower end provided with a plurality of inflow openings adapted for connection, respectively, with the lower ends of a corresponding number of down leg fittings, and a plurality of down leg fittings corresponding in number to the number of said inflow openings, and having elbowed lower ends which connect, respectively with the said inflow openings of said up leg fitting, said inflow openings being disposed in substantially side-by-side rectilinear alignment, and said elbowed lower ends of the down legs being disposed in substantially mutually parallel relationship.

4. A fixture trap device for trapping a plurality of waste outlets comprising a single up leg fitting having an outflow opening and crown weir formed at its upper end, and having an elbowed lower end provided with a plurality of inflow openings adapted for connection, respectively, with the lower ends of a corresponding number of down leg fittings, a plurality of down leg fittings corresponding in number to the number of said inflow openings, and having elbowed lower ends which connect, respectively, with the said inflow openings of said up leg fitting, said inflow openings being disposed in substantially side-by-side rectilinear alignment, and said elbowed lower ends of the down legs being disposed in substantially mutually parallel relationship, and separator walls rising upwardly from the bottom wall of said elbowed lower end of the single up leg fitting between mutually adjacent inflow openings.

WILLIAM C. GROENIGER.